US012605854B2

(12) United States Patent
Sugito et al.

(10) Patent No.: US 12,605,854 B2
(45) Date of Patent: Apr. 21, 2026

(54) PARALLEL LINK MECHANISM, ROBOT MECHANISM, AND BRAKING METHOD

(71) Applicant: KABUSHIKI KAISHA TOSHIBA, Tokyo (JP)

(72) Inventors: Ryuji Sugito, Ota (JP); Hiroaki Kuwahara, Yokohama (JP); Takeshi Toyoshima, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 18/826,368

(22) Filed: Sep. 6, 2024

(65) Prior Publication Data
US 2024/0424696 A1 Dec. 26, 2024

Related U.S. Application Data

(63) Continuation of application No. PCT/JP2023/010715, filed on Mar. 17, 2023.

(30) Foreign Application Priority Data

Mar. 22, 2022 (JP) ................................. 2022-045274

(51) Int. Cl.
B25J 19/00 (2006.01)
B25J 9/00 (2006.01)

(52) U.S. Cl.
CPC ......... B25J 19/0004 (2013.01); B25J 9/0048 (2013.01)

(58) Field of Classification Search
CPC ...... B25J 9/0045; B25J 9/0048; B25J 9/0051; B25J 9/126; B25J 19/0004; H02K 7/102; F16D 49/16
See application file for complete search history.

(56) References Cited

U.S. PATENT DOCUMENTS 10,919,147 B2     2/2021  Matsushita et al.
2009/0095108 A1*  4/2009  Payandeh ................ B25J 13/02
                                                         74/480 R
(Continued)

FOREIGN PATENT DOCUMENTS

EP          0125559 A1 * 11/1984  .......... B25J 19/0004
JP          60-86632 U     6/1985
(Continued)

OTHER PUBLICATIONS

International Search Report issued May 23, 2023 in PCT/JP2023/010715 filed on Mar. 17, 2023, 2 pages.

*Primary Examiner* — Joseph Brown
(74) *Attorney, Agent, or Firm* — Oblon, McClelland, Maier & Neustadt, L.L.P.

(57) ABSTRACT

According to one embodiment, a parallel link mechanism includes a base portion, a movable portion, a braking unit, motors, links, and a switching unit. The movable portion is separated from the base portion in a first direction. The braking unit is provided between the base portion and the movable portion, and includes braking pads. The motors are provided around the braking unit, and each include a drive shaft extending along a direction intersecting the first direction. The links are each coupled between the drive shafts and the movable portion. The switching unit is provided between the base portion and the movable portion. The switching unit is configured to switch, by moving the braking pads, between a contact state in which the braking pads are in contact with the drive shafts and a non-contact state in which the braking pads are separated from the drive shafts.

7 Claims, 12 Drawing Sheets

(56)     References Cited

U.S. PATENT DOCUMENTS

| 2014/0331806 | A1* | 11/2014 | Nagatsuka | ............... | B25J 18/00 |
| | | | | | 901/19 |
| 2018/0236668 | A1* | 8/2018 | Uemura | ................ | B25J 13/088 |
| 2021/0388887 | A1* | 12/2021 | Hayashi | ................ | B25J 9/1623 |
| 2023/0001581 | A1 | 1/2023 | Saito et al. | | |

FOREIGN PATENT DOCUMENTS

| JP | | 2-311138 | A | 12/1990 |
| JP | | 2000-210831 | A | 8/2000 |
| JP | | 2008-286363 | A | 11/2008 |
| JP | | 6688470 | B2 | 4/2020 |
| JP | | 2021-137939 | A | 9/2021 |
| WO | WO 2019/039131 | A1 | | 2/2019 |
| WO | WO 2019/065873 | A1 | | 4/2019 |

* cited by examiner

PARALLEL LINK MECHANISM, ROBOT MECHANISM, AND BRAKING METHOD

CROSS-REFERENCE TO RELATED APPLICATIONS

This is a continuation application of International Patent Application PCT/JP2023/010715, filed on Mar. 17, 2023. This application also claims priority to Japanese Patent Application No. 2022-045274, filed on Mar. 22, 2022. The entire contents of which are incorporated herein by reference.

FIELD

Embodiments of the invention generally relate to a parallel link mechanism, a robot mechanism, and a braking method.

BACKGROUND

There is a parallel link mechanism including multiple motors and multiple links. A technique capable of further downsizing the parallel link mechanism is required.

DETAILED DESCRIPTION

Figure 1:
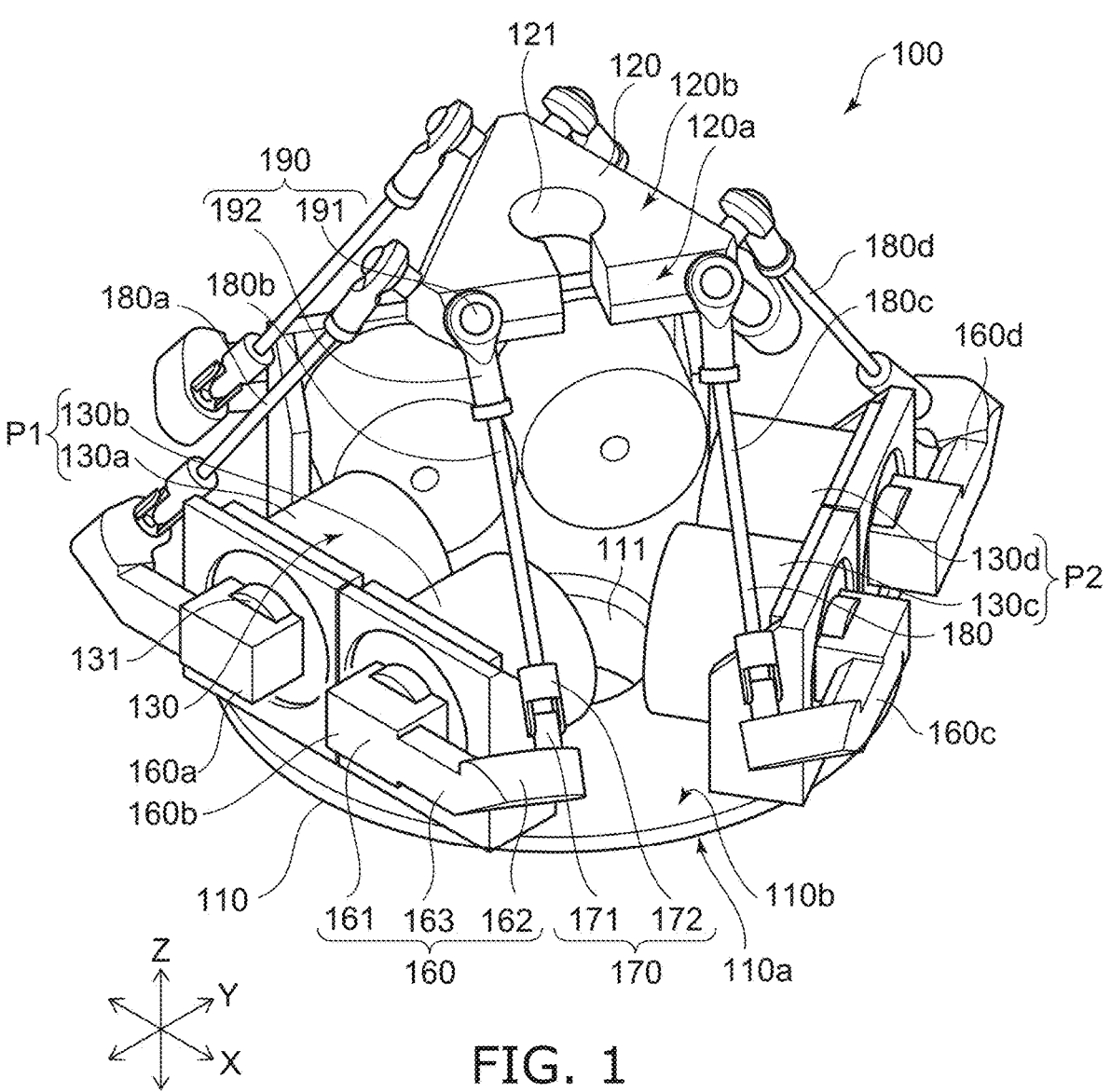
FIG. 1 is a perspective view showing a parallel link mechanism according to the embodiment.

According to one embodiment, a parallel link mechanism includes a base portion, a movable portion, a braking unit, a plurality of motors, a plurality of links, and a switching unit. The movable portion is separated from the base portion in a first direction. The braking unit is provided between the base portion and the movable portion, and includes a plurality of braking pads. The plurality of motors are provided around the braking unit, and each include a drive shaft extending along a direction intersecting the first direction. The plurality of links are each coupled between the plurality of drive shafts and the movable portion. The switching unit is provided between the base portion and the movable portion. The switching unit is configured to switch, by moving the plurality of braking pads, between a contact state in which the plurality of braking pads are in contact with the plurality of drive shafts and a non-contact state in which the plurality of braking pads are separated from the plurality of drive shafts.

Hereinafter, embodiments of the invention will be described with reference to the drawings.

The drawings are schematic or conceptual, and the relationship between the thickness and width of each portion, the proportions of sizes among portions, and the like are not necessarily the same as the actual values. Even the dimensions and proportion of the same portion may be illustrated differently depending on the drawing.

In the specification and drawings, components similar to those already described are marked with like reference numerals, and a detailed description is omitted as appropriate.

Figure 2:
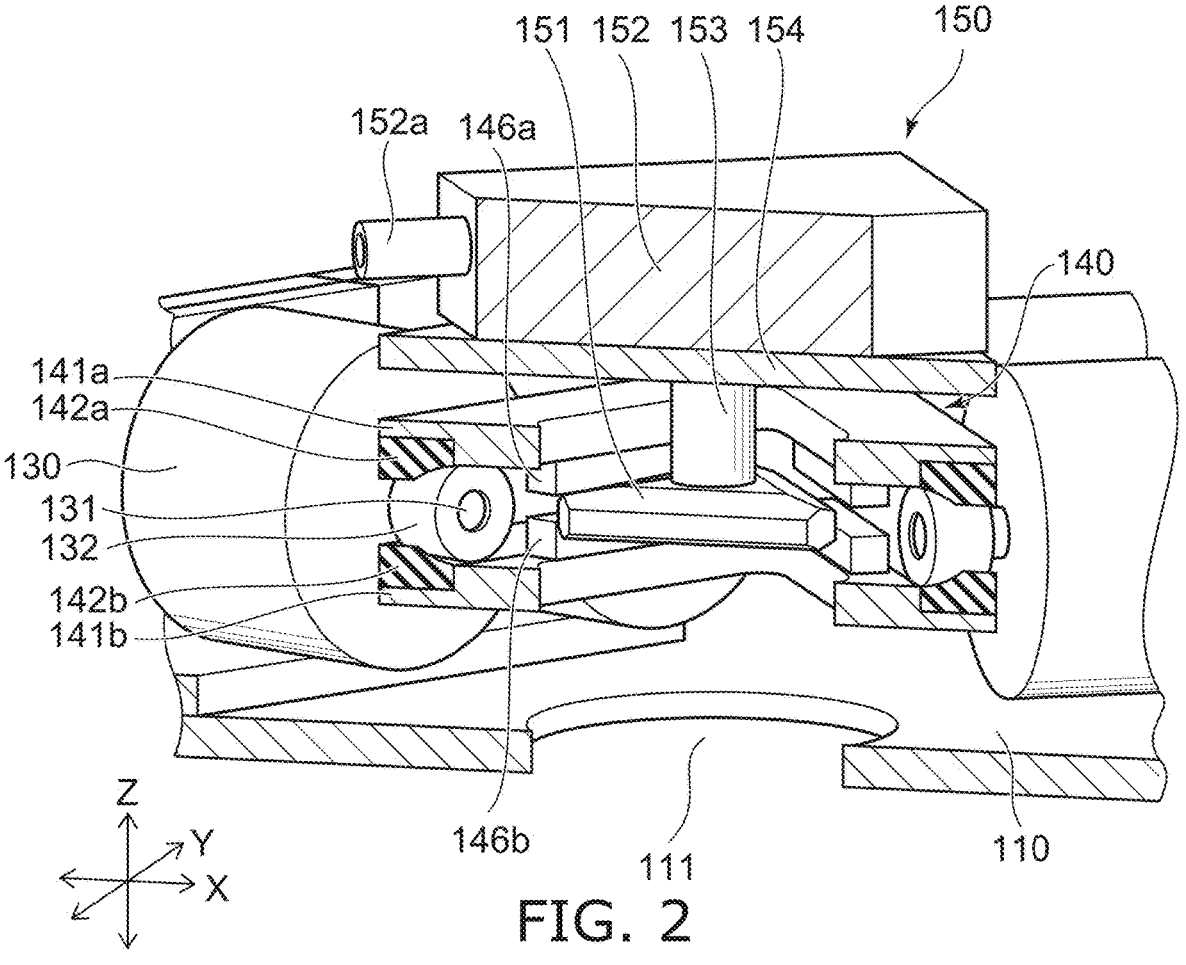
FIG. 2 is a perspective cross-sectional view showing a portion of the parallel link mechanism according to the embodiment.

FIG. 1 is a perspective view showing a parallel link mechanism according to the embodiment. FIG. 2 is a perspective cross-sectional view showing a portion of the parallel link mechanism according to the embodiment.

As shown in FIGS. 1 and 2, a parallel link mechanism 100 according to the embodiment includes a base portion 110, a movable portion 120, motors 130, a braking unit 140, a switching unit 150, rotating arms 160, lower joints 170, links 180, and upper joints 190. In FIG. 1, a portion of the motor 130, the braking unit 140, and the switching unit 150 are omitted.

Here, for the description, a direction from the base portion 110 toward the movable portion 120 is referred to as "upper". A direction opposite to "upper" is referred to as "lower". These directions are based on a relative positional relationship between the base portion 110 and the movable portion 120, and are not related to a direction of gravity. An upper-lower direction is also referred to as a "Z direction" (first direction).

The base portion 110 and the movable portion 120 are separated from each other in the Z direction. The base portion 110 and the movable portion 120 are plate-shaped members provided along an X-Y plane (first plane) intersecting the Z direction. A size of the movable portion 120 in the X-Y plane is smaller than a size of the base portion 110 in the X-Y plane. The movable portion 120 is movable with respect to the base portion 110 by the motors 130, the rotating arms 160, the lower joints 170, the links 180, the upper joints 190, and the like.

The base portion 110 has a lower surface 110a and an upper surface 110b parallel to the X-Y plane. The lower surface 110a is fixed to another member different from the parallel link mechanism 100. The upper surface 110b is opposite to the lower surface 110a, and faces the movable portion 120. The multiple motors 130 are attached to the upper surface 110b, and are provided along an outer periphery (circumferential direction) of the base portion 110. A drive shaft 131 of each motor 130 extends along a direction intersecting the Z direction.

The braking unit 140 and the switching unit 150 are provided between the base portion 110 and the movable portion 120. As shown in FIG. 2, the multiple motors 130 are provided around the braking unit 140 along the X-Y plane.

Figure 3:
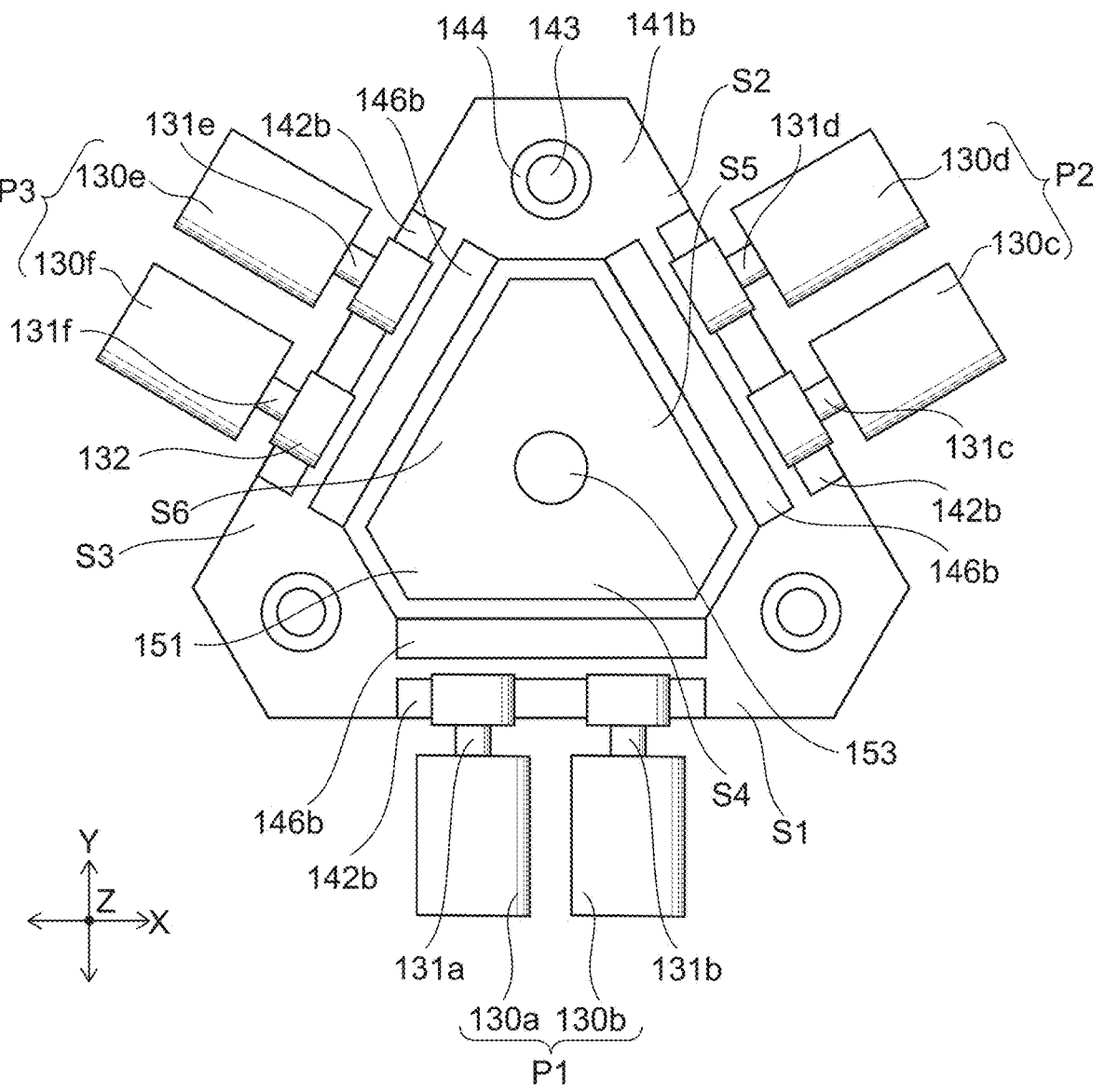
FIG. 3 is a schematic plan view showing a portion of the parallel link mechanism according to the embodiment.
Figure 4:
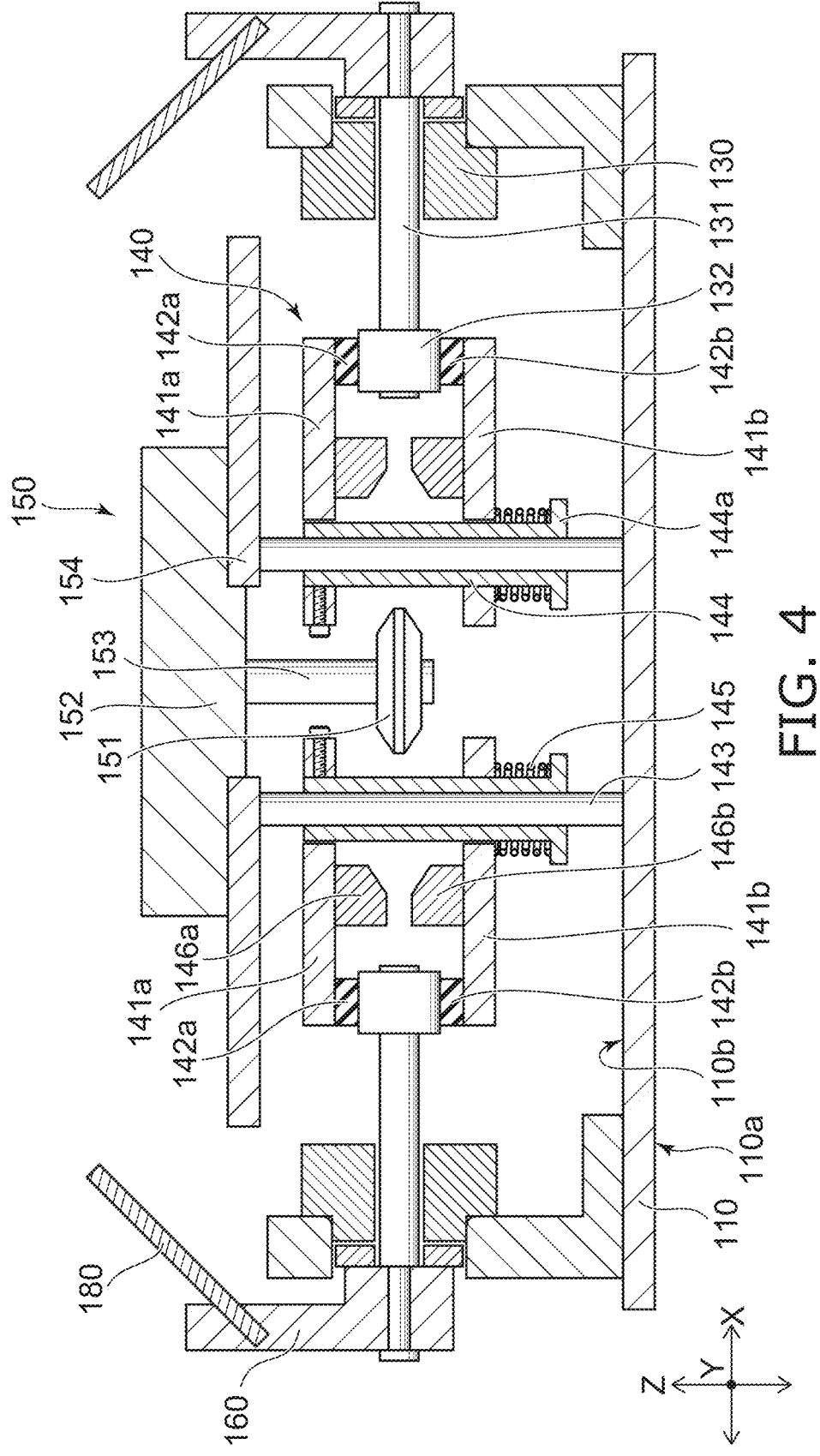
FIG. 4 is a schematic cross-sectional view corresponding to a state shown in FIG. 3.

FIG. 3 is a schematic plan view showing a portion of the parallel link mechanism according to the embodiment. FIG. 4 is a schematic cross-sectional view corresponding to a state shown in FIG. 3.

As shown in FIGS. 2 to 4, the braking unit 140 includes an upper plate 141*a* (first plate), a lower plate 141*b* (second plate), an upper braking pad 142*a* (first braking pad), a lower braking pad 142*b* (second braking pad), a pillar 143, a cylindrical body 144, and an elastic member 145.

The upper plate 141*a* and the lower plate 141*b* are plate-shaped members provided along the X-Y plane. The lower plate 141*b* is positioned between the base portion 110 and the upper plate 141*a*. The upper braking pad 142*a* is attached to an outer periphery of a lower surface of the upper plate 141*a*. The lower braking pad 142*b* is attached to an outer periphery of an upper surface of the lower plate 141*b*. The upper braking pad 142*a* and the lower braking pad 142*b* are made of a material having large friction such as rubber.

The upper braking pad 142*a* and the lower braking pad 142*b* face each other in the Z direction. One end of the drive shaft 131 is positioned between the upper braking pad 142*a* and the lower braking pad 142*b*. In the shown example, a drum 132 is provided at the one end of the drive shaft 131, and the drum 132 is positioned between the upper braking pad 142*a* and the lower braking pad 142*b*. The drum 132 is a cylindrical member, and rotates together with the drive shaft 131. A diameter of the drum 132 is larger than a diameter of the drive shaft 131. The drum 132 may be made of metal or the like, or may be made of a material having large friction, such as the rubber, similarly to the braking pad. A lower surface of the upper braking pad 142*a* and an upper surface of the lower braking pad 142*b* are curved along a surface of the drum 132. By providing the drum 132, a contact area between the drive shaft 131 and the upper braking pad 142*a* and a contact area between the drive shaft 131 and the lower braking pad 142*b* are increased. Accordingly, a braking force obtained by the upper braking pad 142*a* and the lower braking pad 142*b* can be increased. When the diameter of the drive shaft 131 is sufficiently large, the drum 132 may be omitted.

As shown in FIG. 4, a lower end of the pillar 143 is fixed to the base portion 110. The pillar 143 extends along the Z direction, and penetrates the upper plate 141*a* and the lower plate 141*b*. The cylindrical body 144 is provided around the pillar 143, and extends along the Z direction similarly to the pillar 143. The cylindrical body 144 is slidable with respect to the pillar 143. An upper end of the cylindrical body 144 is fixed to the upper plate 141*a*. On the other hand, the lower plate 141*b* is movable with respect to the cylindrical body 144.

A stopper 144*a* extending laterally is provided at a lower end of the cylindrical body 144. The stopper 144*a* is positioned between the base portion 110 and the lower plate 141*b*. The elastic member 145 is provided between the stopper 144*a* and the lower plate 141*b*. The elastic member 145 is in a compressed state. Therefore, the elastic member 145 generates an elastic force in a direction in which the stopper 144*a* and the lower plate 141*b* move away from each other. The lower plate 141*b* is pushed toward the upper plate 141*a* by the elastic force. Further, the stopper 144*a* is pushed downward by the elastic force, so that the upper plate 141*a* coupled to the cylindrical body 144 is pushed toward the lower plate 141*b*. That is, the elastic member 145 biases the upper plate 141*a* and the lower plate 141*b* in a direction in which these plates approach to each other.

During braking of the motor 130, the upper braking pad 142*a* and the lower braking pad 142*b* sandwich the drum

132. The motor 130 is braked by a frictional force between the drum 132 and the upper braking pad 142*a* and a frictional force between the drum 132 and the lower braking pad 142*b*. For example, a movement of the drive shaft 131 of the motor 130 is completely stopped.

The switching unit 150 includes a rotating body 151, an actuator 152, a drive shaft 153, and a pedestal 154. The rotating body 151 is positioned between the upper plate 141*a* and the lower plate 141*b*. The rotating body 151 is a plate-shaped member provided along the X-Y plane. The drive shaft 153 extends in the Z direction. A lower end of the drive shaft 153 is fixed to a center of the rotating body 151 on the X-Y plane. An upper end of the drive shaft 153 is coupled to the actuator 152. The actuator 152 rotates the drive shaft 153 around the Z direction, so that the rotating body 151 rotates around the Z direction with respect to the motor 130, the braking unit 140, and the like.

The pedestal 154 is provided between the upper plate 141*a* and the movable portion 120. The actuator 152 is placed on the pedestal 154. As shown in FIG. 4, the pedestal 154 is fixed to upper ends of the pillars 143. The pedestal 154 is fixed to the base portion 110 via the pillars 143.

Figure 5:
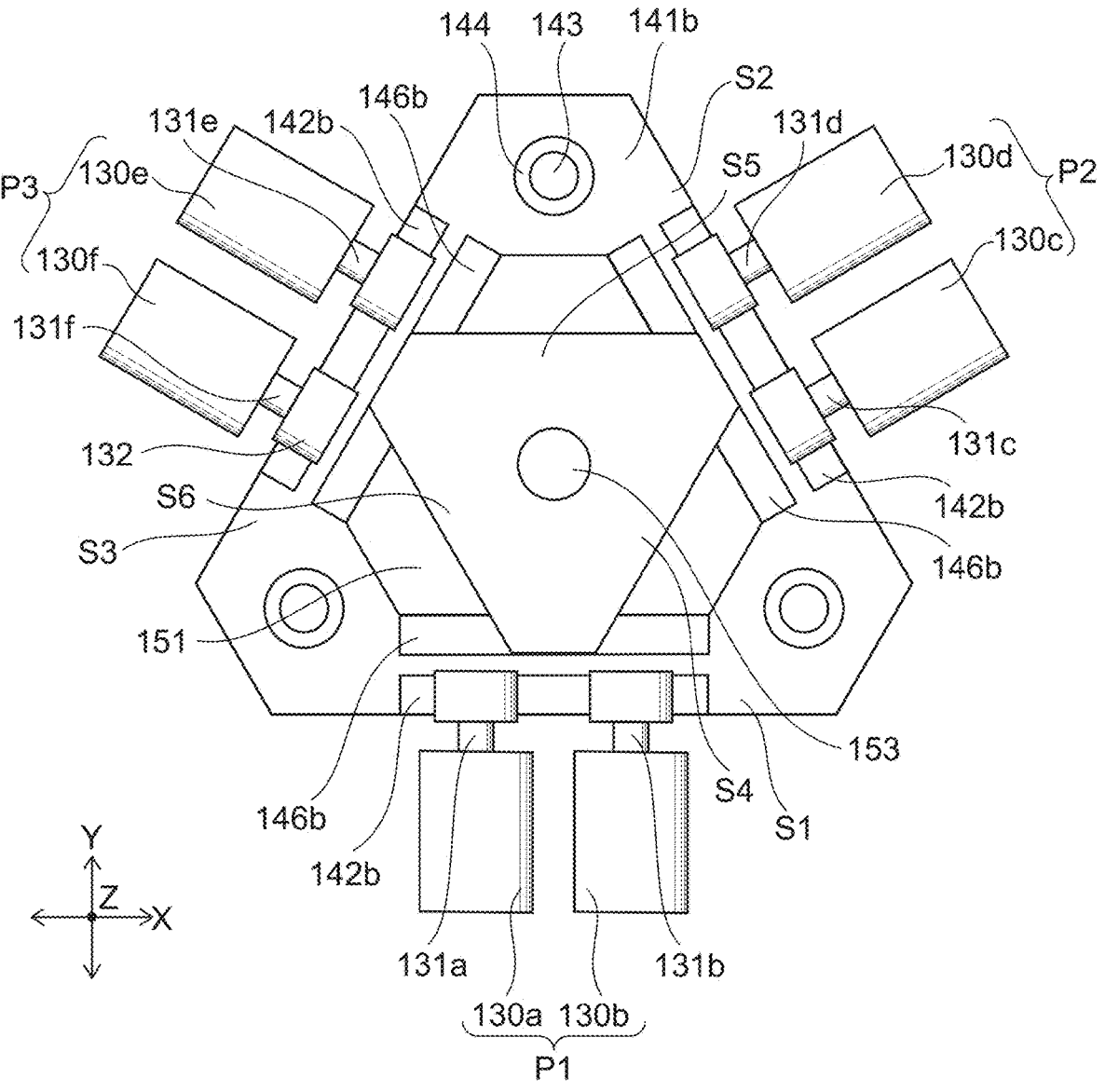
FIG. 5 is a schematic plan view showing the portion of the parallel link mechanism according to the embodiment.
Figure 6:
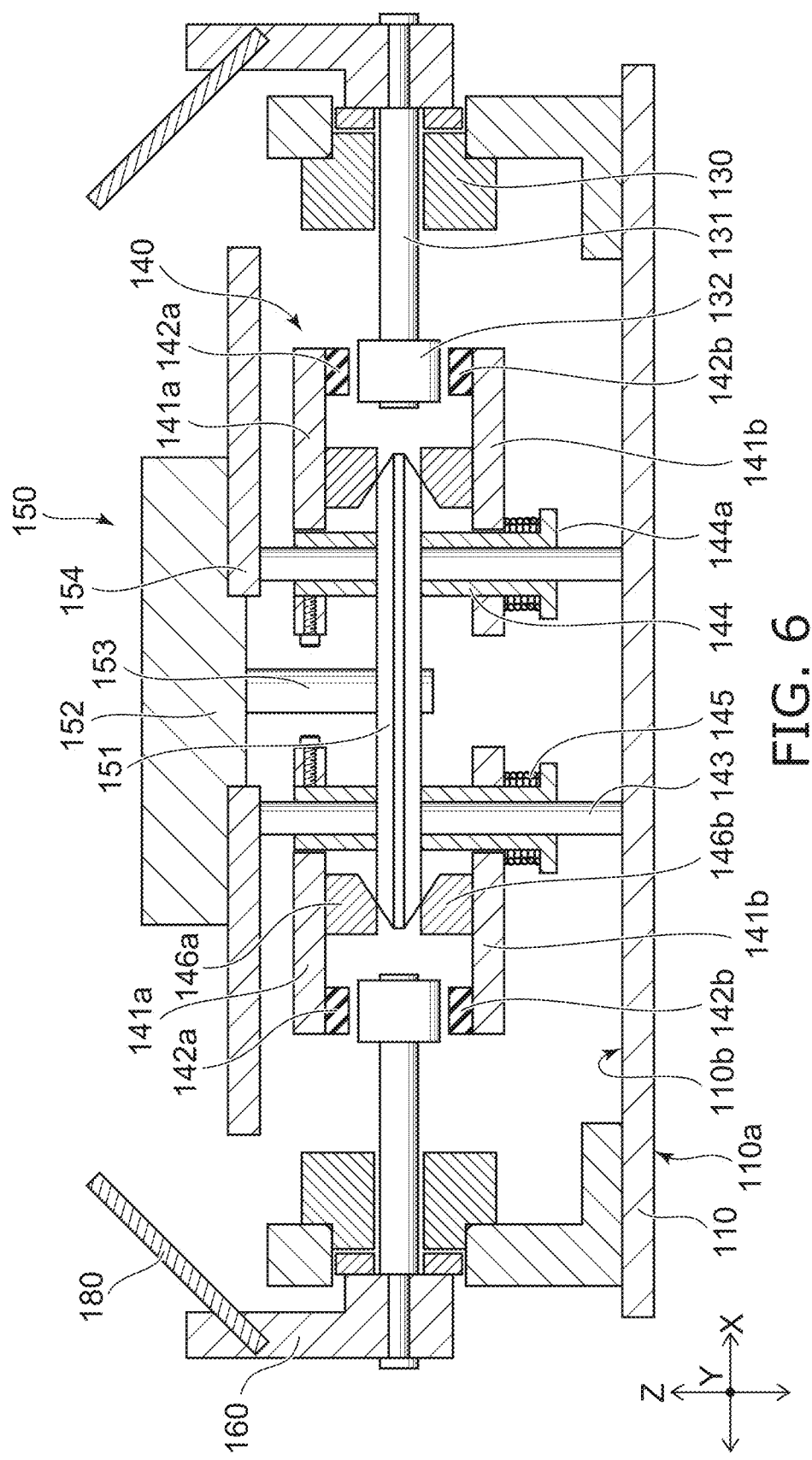
FIG. 6 is a schematic cross-sectional view corresponding to a state shown in FIG. 5.

FIG. 5 is a schematic plan view showing the portion of the parallel link mechanism according to the embodiment. FIG. 6 is a schematic cross-sectional view corresponding to a state shown in FIG. 5.

A distance from a rotation center (drive shaft 153) of the rotating body 151 to an outer edge of the rotating body 151 is non-uniform. For example, as shown in FIGS. 3 and 5, the rotating body 151 has a polygonal shape when viewed from the Z direction, and has multiple corners. In the shown example, the rotating body 151 has an equilateral triangular shape with missing corners. Therefore, as shown in FIGS. 3 to 6, in accordance with a rotation angle of the rotating body 151, there are a state in which the rotating body 151 is in contact with the upper plate 141*a* and the lower plate 141*b* and a state in which the rotating body 151 is not in contact with the upper plate 141*a* and the lower plate 141*b*.

As shown, the upper plate 141*a* may include an upper protrusion 146*a* protruding downward. The upper protrusion 146*a* is positioned on an inner periphery of the lower surface of the upper plate 141*a*. The lower plate 141*b* may include a lower protrusion 146*b* protruding upward. The lower protrusion 146*b* is positioned on an inner periphery of the upper surface of the lower plate 141*b*. The upper protrusion 146*a* and the lower protrusion 146*b* face each other in the Z direction. When the rotating body 151 rotates, the rotating body 151 comes into contact with the upper protrusion 146*a* and the lower protrusion 146*b*. For example, an inner periphery of a lower surface of the upper protrusion 146*a*, an inner periphery of an upper surface of the lower protrusion 146*b*, and outer peripheral surfaces of the rotating body 151 are chamfered, such that the rotating body 151 smoothly comes into contact with the upper protrusion 146*a* and the lower protrusion 146*b* with small friction.

In a state where the rotating body 151 is not in contact with the upper protrusion 146*a* and the lower protrusion 146*b*, a gap between the upper protrusion 146*a* and the lower protrusion 146*b* is smaller than a thickness of the rotating body 151. When the rotating body 151 is inserted between the upper protrusion 146*a* and the lower protrusion 146*b*, the upper plate 141*a* and the lower plate 141*b* move in directions separated from each other. Accordingly, the upper braking pad 142*a* and the lower braking pad 142*b* are separated from the drum 132. The frictional force between the upper braking pad 142*a* and the drum 132 and the frictional force between the lower braking pad 142b and the drum 132 reduce, so that the drive shaft 131 becomes rotatable.

When the rotating body 151 is removed from between the upper protrusion 146a and the lower protrusion 146b and is separated from the upper protrusion 146a and the lower protrusion 146b, the upper plate 141a and the lower plate 141b move in directions approaching to each other due to the elastic force of the elastic member 145. Accordingly, the upper braking pad 142a and the lower braking pad 142b come into contact with the drum 132. Each of the frictional forces between each braking pad and the drum 132 increases, so that the drive shaft 131 is braked.

The actuator 152 rotates the rotating body 151 to switch between a contact state in which the upper braking pad 142a and the lower braking pad 142b are in contact with the drive shaft 131 and a non-contact state in which the upper braking pad 142a and the lower braking pad 142b are not in contact with the drive shaft 131.

In the shown specific example, six motors 130a to 130f are provided. Each motor 130 is adjacent to any other motor 130. As shown in FIGS. 3 and 5, three pairs P1 to P3 of the motors 130 adjacent to one another are provided. The pair P1 includes the motors 130a and 130b. The pair P2 includes the motors 130c and 130d. The pair P3 includes the motors 130e and 130f. The pairs P1 to P3 are provided at equal intervals around the braking unit 140.

Drive shafts 131a to 131f of the motors 130a to 130f are parallel to the X-Y plane, and extend along a direction from a center portion of the base portion 110 toward the outer periphery of the base portion 110. In each pair, the drive shafts 131 of the motors 130 are parallel to each other, and the motors 130 are adjacent to each other in a direction perpendicular to the drive shafts 131.

The upper plate 141a and the lower plate 141b each have sides S1 to S3 along directions connecting the drive shafts 131 of the respective pairs, and have the equilateral triangular shape with the missing corners when viewed from the Z direction. The upper braking pad 142a and the lower braking pad 142b are provided at respective positions of each of the sides S1 to S3. One pair of drive shafts 131 are sandwiched between one set of the upper braking pad 142a and the lower braking pad 142b. Three sets of the pillar 143 and the cylindrical body 144 are provided at corner positions of the upper plate 141a and the lower plate 141b, respectively.

The rotating body 151 has the equilateral triangular shape as described above, and has sides S4 to S6. As shown in FIG. 3, in one state of the rotating body 151, the sides S4 to S6 are parallel to the sides S1 to S3, respectively. The sides S4 to S6 face the drive shafts 131 of the pairs in the X-Y plane, respectively.

A portion (first portion 161) of the rotating arm 160 is fixed to the drive shaft 131 on a side opposite from the drum 132. The rotating arm 160 is driven around the drive shaft 131 by the motor 130. The lower joint 170 is attached to another portion (second portion 162) of the rotating arm 160. A direction from the first portion 161 toward the second portion 162 intersects a direction of the drive shaft 131. A bent portion 163 is provided between the first portion 161 and second portion 162 of the rotating arm 160. The second portion 162 is positioned closer to the movable portion 120 as compared with the first portion 161.

One end of the link 180 is coupled to the second portion 162 of the rotating arm 160 via the lower joint 170. The lower joint 170 is, for example, a universal joint having two degrees of freedom. The lower joint 170 includes couplers

171 and 172. The coupler 171 is fixed to the second portion 162 of the rotating arm 160. The coupler 172 is fixed to the one end of the link 180. The coupler 172 is rotatable with respect to the coupler 171.

The other end of the link 180 is coupled to the movable portion 120 via the upper joint 190. The upper joint 190 is attached to a side surface 120a of the movable portion 120. The side surface 120a is inclined with respect to the Z direction and faces upward. The upper joint 190 is, for example, a ball joint having three degrees of freedom. The upper joint 190 includes a ball 191 and a socket 192. A shaft center of the socket 192 is fixed to the other end of the link 180, and is in spherical contact with the ball 191. The ball 191 is fixed to the side surface 120a. When an angle of the socket 192 changes, the ball 191 is separated from the side surface 120a in order to avoid interference between the socket 192 and the movable portion 120.

The multiple links 180 couple the multiple drive shafts 131 and the movable portion 120 in parallel, respectively. An end effector is attached to an upper surface 120b of the movable portion 120. The side surface 120a is contiguous to the upper surface 120b. When the drive shaft 131 rotates, the second portion 162 of the rotating arm 160 rotates with respect to the first portion 161. Accordingly, a position and a posture of the movable portion 120 coupled to the second portions 162 via the links 180 change.

As shown in FIG. 1, a hole 111 may be provided in the base portion 110. The hole 111 penetrates the base portion 110 along the Z direction. The hole 111 is used for positioning the base portion 110 when the base portion 110 is fixed to another member or for inserting wiring. Similarly, a hole 121 for passing wiring of the end effector may be provided in the movable portion 120. The hole 121 penetrates the movable portion 120 along the Z direction.

In the shown specific example, six sets of the motor 130, the rotating arm 160, the lower joint 170, the link 180, and the upper joint 190 are provided. A pair of rotating arms 160a and 160b are coupled to the pair of motors 130a and 130b, respectively, such that the second portions 162 thereof face opposite directions to each other. Similarly, a pair of rotating arms 160c and 160d are coupled to the pair of motors 130c and 130d, respectively, such that the second portions 162 thereof face opposite directions to each other. The same applies to the other two rotating arms 160.

The link 180 coupled to one of the pair of rotating arms 160 and the link 180 coupled to one of another pair of rotating arms 160 are coupled to the same side surface 120a. For example, a link 180b coupled to the rotating arm 160b and a link 180c coupled to the rotating arm 160c are coupled to the same side surface 120a. A link 180a coupled to the rotating arm 160a and a link 180d coupled to the rotating arm 160d are coupled to different side surfaces 120a, respectively. Rotation angles of the six respective drive shafts 131a to 131f are independently controlled, so that the movable portion 120 has six degrees of freedom with respect to the base portion 110.

By providing the bent portion 163, a deflection angle of the lower joint 170 can be reduced in a state where the movable portion 120 is in a standard posture. The side surface 120a is inclined with respect to the Z direction, so that a deflection angle of the upper joint 190 can be reduced. For example, an angle of the bent portion 163 is set such that the deflection angle of the lower joint 170 is 0 degrees in the state where the movable portion 120 is in the standard posture.

Advantages of the Embodiment Will be Described

When a power supply is cut off due to a power failure or the like and a control system of the parallel link mechanism 100 does not operate, there is a possibility that the parallel link mechanism 100 moves without control due to inertia, a weight of the end effector, or the like. For safety, it is desired that a movement of the movable portion 120 is stopped in an emergency such as when power is cut off. That is, it is desired that the motor 130 is braked. Generally, an emergency brake is provided on the drive shaft for braking the motor in the emergency. The emergency brake includes a braking mechanism and an actuator for operating the braking mechanism, and is provided on each drive shaft.

For a purpose of working in a smaller space, avoiding interference with other devices, or the like, the parallel link mechanism may be downsized. In order to downsize the parallel link mechanism, it is desired to downsize the motors, so that the motors can be disposed closer to each other. However, when the emergency brake is provided in each motor, a size of the motor increases, and as a result, a size of the parallel link mechanism also increases.

For this problem, the parallel link mechanism 100 according to the embodiment includes the braking unit 140 and the switching unit 150. The braking unit 140 includes the multiple upper braking pads 142a and the multiple lower braking pads 142b that are provided inside the multiple motors 130 and face the multiple drive shafts 131. The switching unit 150 collectively moves the multiple upper braking pads 142a and the multiple lower braking pads 142b by the operation of the actuator 152. By moving the multiple upper braking pads 142a and the multiple lower braking pads 142b, the switching unit 150 switches between the contact state in which these braking pads are in contact with the multiple drive shafts 131 and the non-contact state in which these braking pads are separated from the multiple drive shafts 131. The multiple drive shafts 131 can be collectively braked by the operation of the switching unit 150. According to the embodiment, it is not necessary to provide an actuator for driving the braking pads for each motor 130. Therefore, the parallel link mechanism 100 can be downsized as compared with the case where the emergency brake is provided for each motor 130.

In particular, in the parallel link mechanism 100, each drive shaft 131 is provided along the direction from the center portion of the base portion 110 toward the outer periphery of the base portion 110. The one ends of the respective drive shafts 131 are positioned between the center portion of the base portion 110 and the movable portion 120. The one ends of the respective drive shafts 131 are provided close to one another, so that the braking pads can also be provided close to one another. Accordingly, a size of the braking unit 140 can be reduced. As a result, the parallel link mechanism 100 can be further downsized.

Preferably, the braking unit 140 sandwiches the drive shaft 131 by a pair of braking pads (the upper braking pad 142a and the lower braking pad 142b) in the direction intersecting the drive shaft 131. By sandwiching the drive shaft 131, displacement of the drive shaft 131 when the braking pads come into contact with the drive shaft 131 can be prevented. The displacement of the drive shaft 131 is prevented, so that the frictional force between the drive shaft 131 and the braking pads is increased, and the drive shaft 131 can be stopped more reliably and more quickly. Further, a load to be applied to the drive shaft 131 can be reduced, and the motor 130 is hardly damaged.

The actuator 152 maintains the rotation angle of the rotating body 151 such that the non-contact state is maintained when the parallel link mechanism 100 operates. When electric power is no longer supplied to the actuator 152, the rotating body 151 rotates, and the non-contact state is shifted to the contact state. The multiple drive shafts 131 are braked, and the operation of the parallel link mechanism 100 is stopped. For example, the actuator 152 is a rotary actuator. When the actuator 152 receives a supply of air through a tube 152a, the drive shaft 153 and the rotating body 151 rotate to a preset angle, and the contact state is shifted to the non-contact state. When the supply of air to the actuator 152 is stopped, the drive shaft 153 and the rotating body 151 rotate to an initial angle, and the non-contact state is shifted to the contact state.

Figure 7:
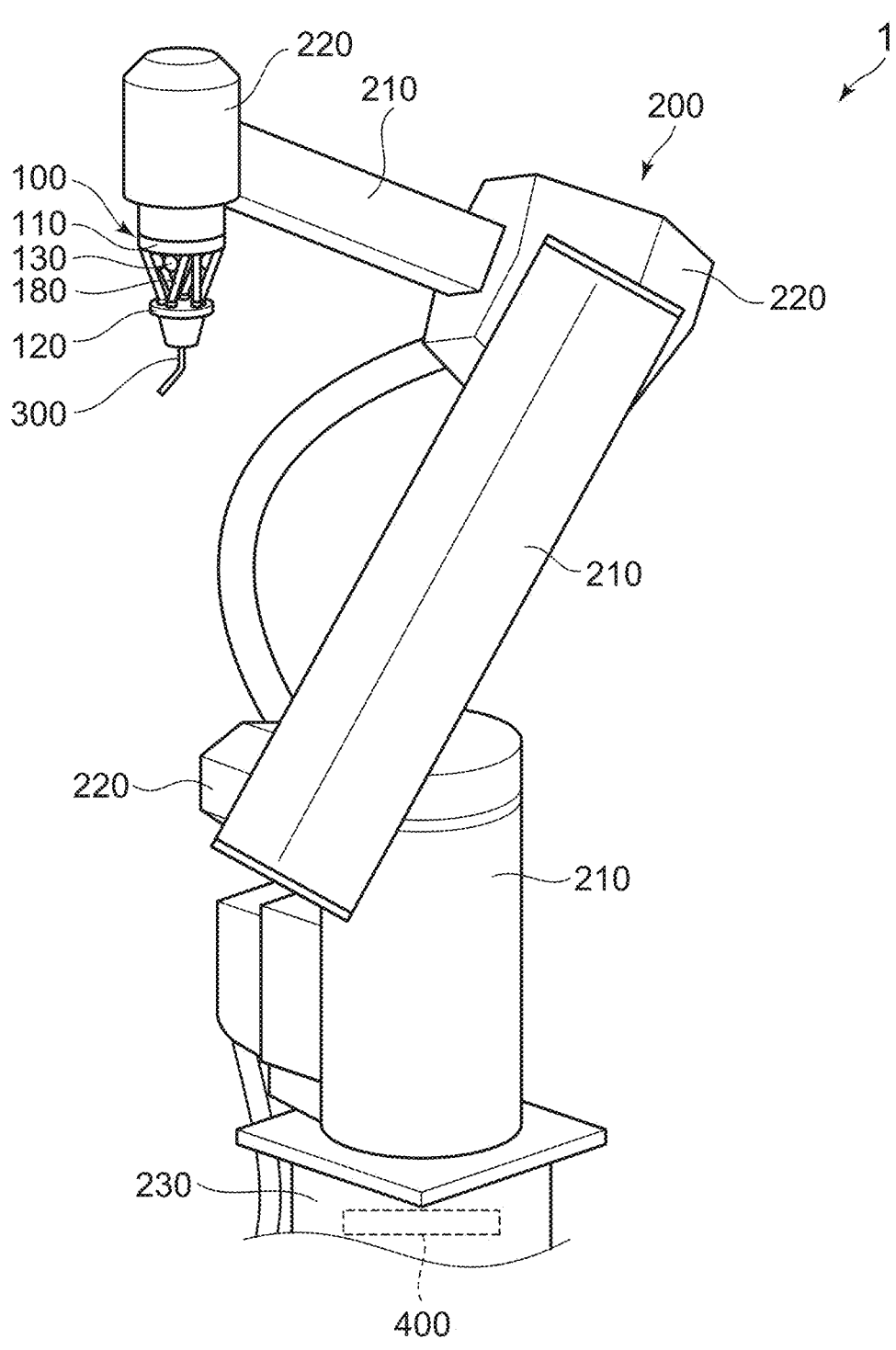
FIG. 7 is a schematic view showing a configuration of a robot mechanism according to the embodiment.

FIG. 7 is a schematic view showing a configuration of a robot mechanism according to the embodiment.

A robot mechanism 1 according to the embodiment includes the parallel link mechanism 100, a manipulator 200, an end effector 300, and a control device 400.

In the shown example, the manipulator 200 is a vertical articulated robot, and includes multiple links 210 and multiple rotating shafts 220 connected in series. One ends of the links 210 are coupled by the rotating shaft 220. When the rotating shaft 220 is driven by the motor, one link 210 rotates with respect to the other link 210. The manipulator 200 may be a horizontal articulated robot or a linear motion robot.

The parallel link mechanism 100 is attached to a distal end of the manipulator 200. Specifically, the parallel link mechanism 100 is attached to any portion of the link 210 on one end among the multiple links 210. The link 210 on the other end among the multiple links 210 is coupled to a base 230. The base 230 is fixed to an arrangement place such as a floor, a wall, or another mechanism. The base 230 stores electrical components and driving components such as motors. As shown in the drawing, the control device 400 may be stored in the base 230, or may be provided separately from the base 230.

It is favorable that a degree of freedom of the manipulator 200 is four degrees of freedom or more. For example, the manipulator 200 is the vertical articulated robot, and has six degrees of freedom. The parallel link mechanism 100 further has six degrees of freedom with respect to the distal end of the manipulator 200.

The control device 400 transmits a drive signal to the motor 130, the actuator 152, and the like of the parallel link mechanism 100. Each motor 130 is driven according to the drive signal, and the rotation angle of the rotating shaft of each motor 130 is controlled. Accordingly, the position and the posture of the movable portion 120 with respect to the base portion 110 are controlled. Similarly, the control device 400 transmits the drive signal to each motor of the manipulator 200. Each motor is driven according to the drive signal, and a rotation angle of each rotating shaft 220 is controlled. Accordingly, a posture of a distal end portion of the manipulator 200 is controlled.

The control device 400 is connected to the parallel link mechanism 100 and the manipulator 200 via wired communication, wireless communication, or a network. The control device 400 may include multiple control units. For example, another control unit (another robot controller) that controls the parallel link mechanism 100, a control unit (robot controller) that controls the manipulator 200, and still another control unit that transmits and receives data to and from these control units may be provided. These control units are connected to one another by the wired communication, the wireless communication, or the network.

The control device 400 controls the end effector 300 in accordance with functions of the end effector 300. For example, the end effector 300 includes a welding device for performing spot resistance welding. Alternatively, the end effector 300 may include an ultrasonic transceiver (transducer) for inspecting a welded portion obtained by the spot resistance welding.

Figure 8A:
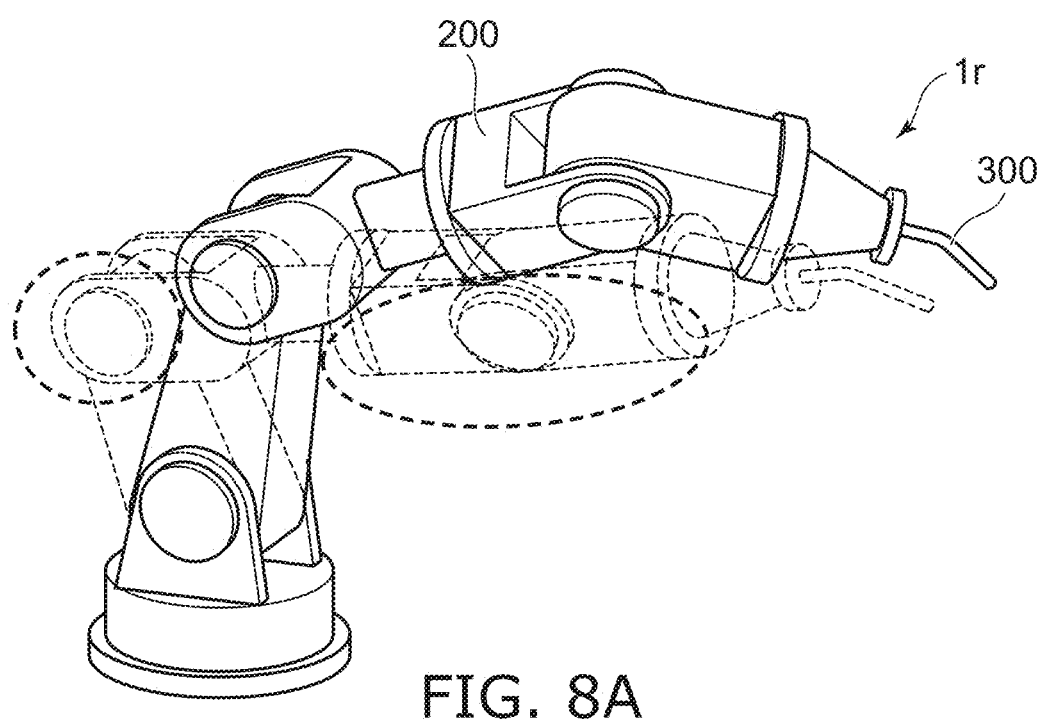
FIG. 8A is a schematic view showing movements of a robot mechanism according to a reference example.
Figure 8B:
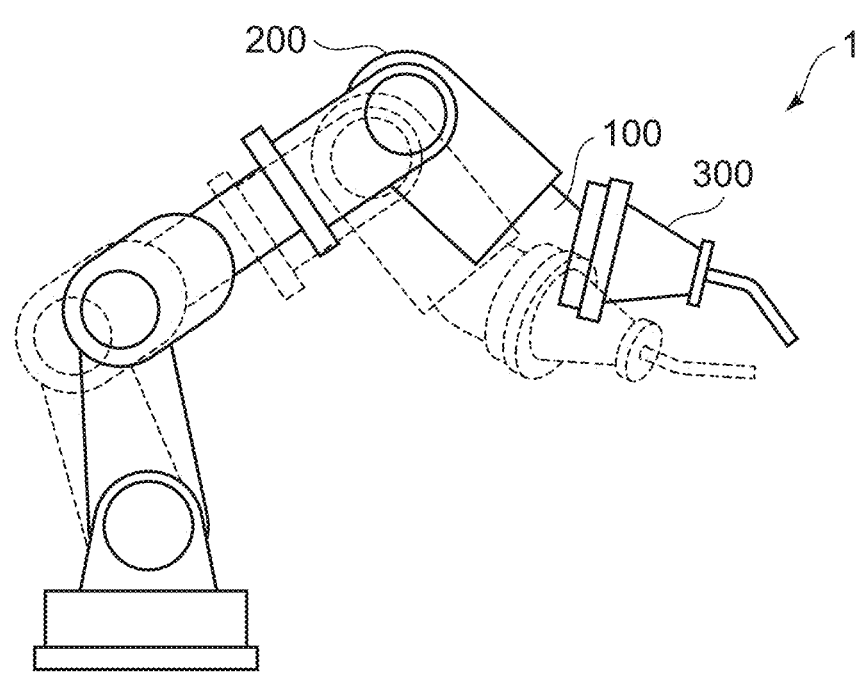
FIG. 8B is a schematic view showing movements of the robot mechanism according to the embodiment.

FIG. 8A is a schematic view showing movements of a robot mechanism according to a reference example. FIG. 8B is a schematic view showing movements of the robot mechanism according to the embodiment.

In a robot mechanism 1r according to the reference example shown in FIG. 8A, the end effector 300 is directly attached to the distal end of the manipulator 200. When the robot mechanism 1r operates, a posture of the end effector 300 can be finely adjusted. For example, as shown in FIG. 8A, the manipulator 200 moves from a state shown by a solid line to a state shown by a broken line. In this case, since a movement of a portion enclosed by a dotted circle is particularly large, there is a possibility that the robot mechanism 1r interferes with other members.

On the other hand, in the robot mechanism 1 according to the embodiment shown in FIG. 8B, the end effector 300 is attached to the distal end of the manipulator 200 via a parallel link mechanism 100. When the posture of the end effector 300 is adjusted, the posture of the end effector 300 can be adjusted by operating the parallel link mechanism 100. As shown in FIG. 8B, the movement of the manipulator 200 can be reduced by the operation of the parallel link mechanism 100 or a combination of the operations of the manipulator 200 and the parallel link mechanism 100. Therefore, it is possible to reduce the possibility that the robot mechanism 1 interferes with other members.

According to the embodiment, since the movement of the manipulator 200 can be reduced, the robot mechanism 1 can operate more safely even in an environment in which other devices are provided around the robot mechanism 1 or an environment in which the multiple robot mechanisms 1 are disposed side by side. In this manner, the parallel link mechanism 100 according to the embodiment is particularly suitable for a combination with the manipulator 200.

(First Variation)

Figure 9:
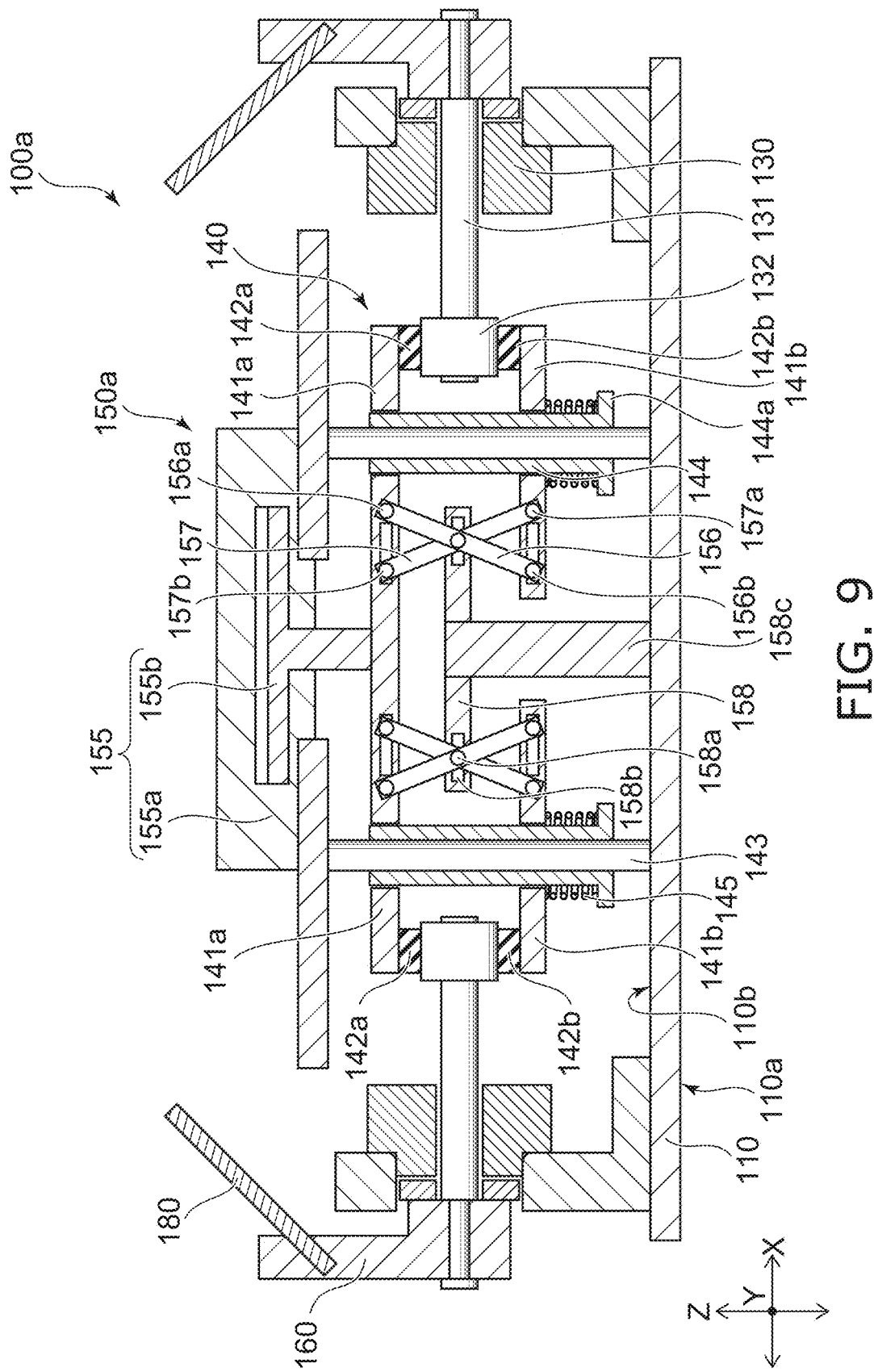
FIG. 9 is a schematic cross-sectional view showing a portion of a parallel link mechanism according to a first variation of the embodiment.
Figure 10:
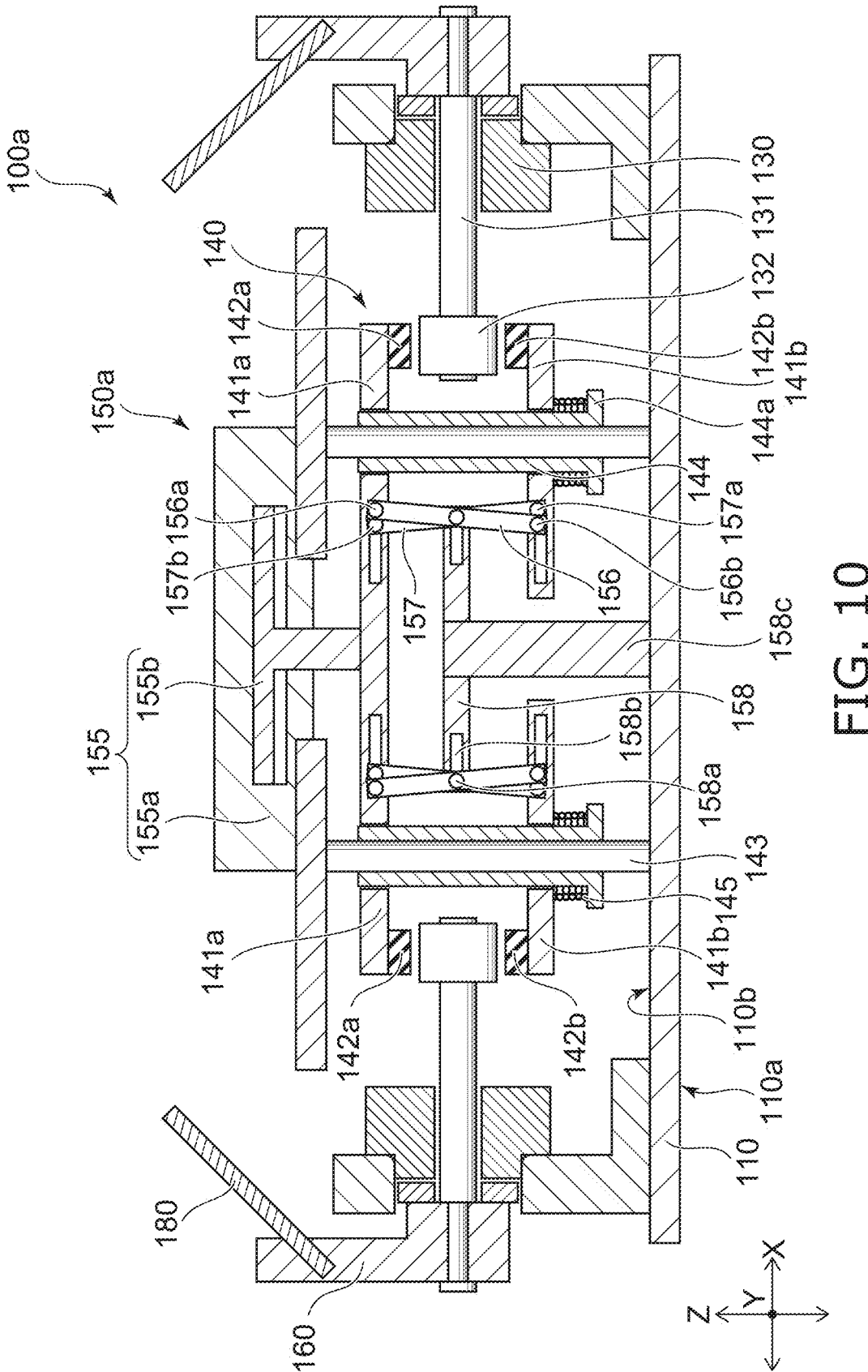
FIG. 10 is a schematic cross-sectional view showing the portion of the parallel link mechanism according to the first variation of the embodiment.

FIGS. 9 and 10 are schematic cross-sectional views showing a portion of a parallel link mechanism according to a first variation of the embodiment.

In a parallel link mechanism 100a shown in FIGS. 9 and 10, a switching unit 150a is provided instead of the switching unit 150. The switching unit 150a includes the pedestal 154, an actuator 155, links 156, links 157, and an intermediate plate 158.

The actuator 155 is, for example, an air cylinder. The actuator 155 includes a cylinder 155a and a piston 155b. The piston 155b slides in the Z direction in accordance with a pressure in the cylinder 155a. The upper plate 141a is fixed to the piston 155b.

One end 156a of the link 156 is rotatably coupled to the upper plate 141a. A position of the one end 156a with respect to the upper plate 141a is fixed. The other end 156b of the link 156 is coupled to the lower plate 141b so as to be slidable along the X-Y plane. One end 157a of the link 157 is rotatably coupled to the lower plate 141b. A position of the one end 157a with respect to the lower plate 141b is fixed. The other end 157b of the link 157 is coupled to the upper plate 141a so as to be slidable along the X-Y plane.

The intermediate plate 158 is provided between the upper plate 141a and the lower plate 141b. A position of the intermediate plate 158 in the Z direction is the same as a position of the drive shaft 131 in the Z direction. The link 156 and the link 157 are coupled to each other in an X shape. Specifically, a center of the link 156 and a center of the link 157 are rotatably coupled to each other by a shaft 158a. A hole 158b extending along the X-Y plane is provided in the intermediate plate 158. The shaft 158a passes through the hole 158b. Accordingly, a position of the shaft 158a in the Z direction is fixed. The shaft 158a can slide in the hole 158b along the X-Y plane. The intermediate plate 158 is fixed to the base portion 110 by a pillar 158c. Even when the actuator 155 operates, the intermediate plate 158 does not move, and the position of the shaft 158a in the Z direction does not change.

As shown in FIG. 9, when the actuator 155 operates and the piston 155b moves downward, the upper plate 141a moves downward. When the upper plate 141a approaches the intermediate plate 158, the link 156 and the link 157 rotate with respect to the upper plate 141a, so that the lower plate 141b also approaches the intermediate plate 158. That is, the lower plate 141b is interlocked with the upper plate 141a. As the upper plate 141a and the lower plate 141b move, the upper braking pad 142a and the lower braking pad 142b come into contact with the drum 132, so that the motor 130 is braked. Further, the elastic member 145 pushes up the lower plate 141b, so that the upper braking pad 142a and the lower braking pad 142b can push against the drum 132 with a stronger force. Accordingly, the braking force can be increased.

As shown in FIG. 10, when the actuator 155 operates and the piston 155b moves upward, the upper plate 141a moves upward. When the upper plate 141a moves in a direction separated from the intermediate plate 158, the link 156 and the link 157 rotate with respect to the upper plate 141a, so that the lower plate 141b also moves in the direction separated from the intermediate plate 158. Accordingly, the upper braking pad 142a and the lower braking pad 142b are separated from the drum 132, so that the drive shaft 131 becomes rotatable.

(Second Variation)

Figure 11:
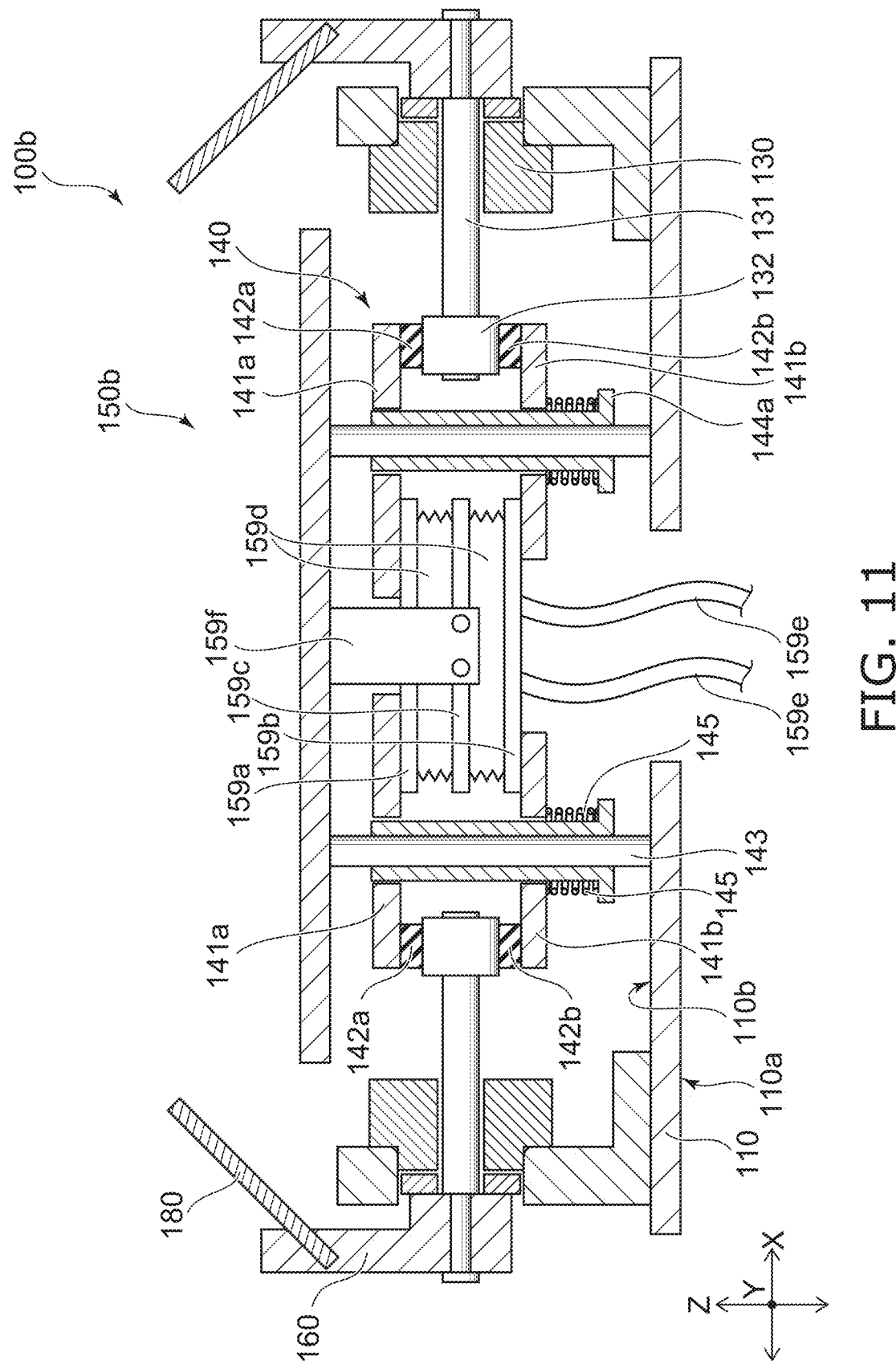
FIG. 11 is a schematic cross-sectional view showing a portion of a parallel link mechanism according to a second variation of the embodiment.
Figure 12:
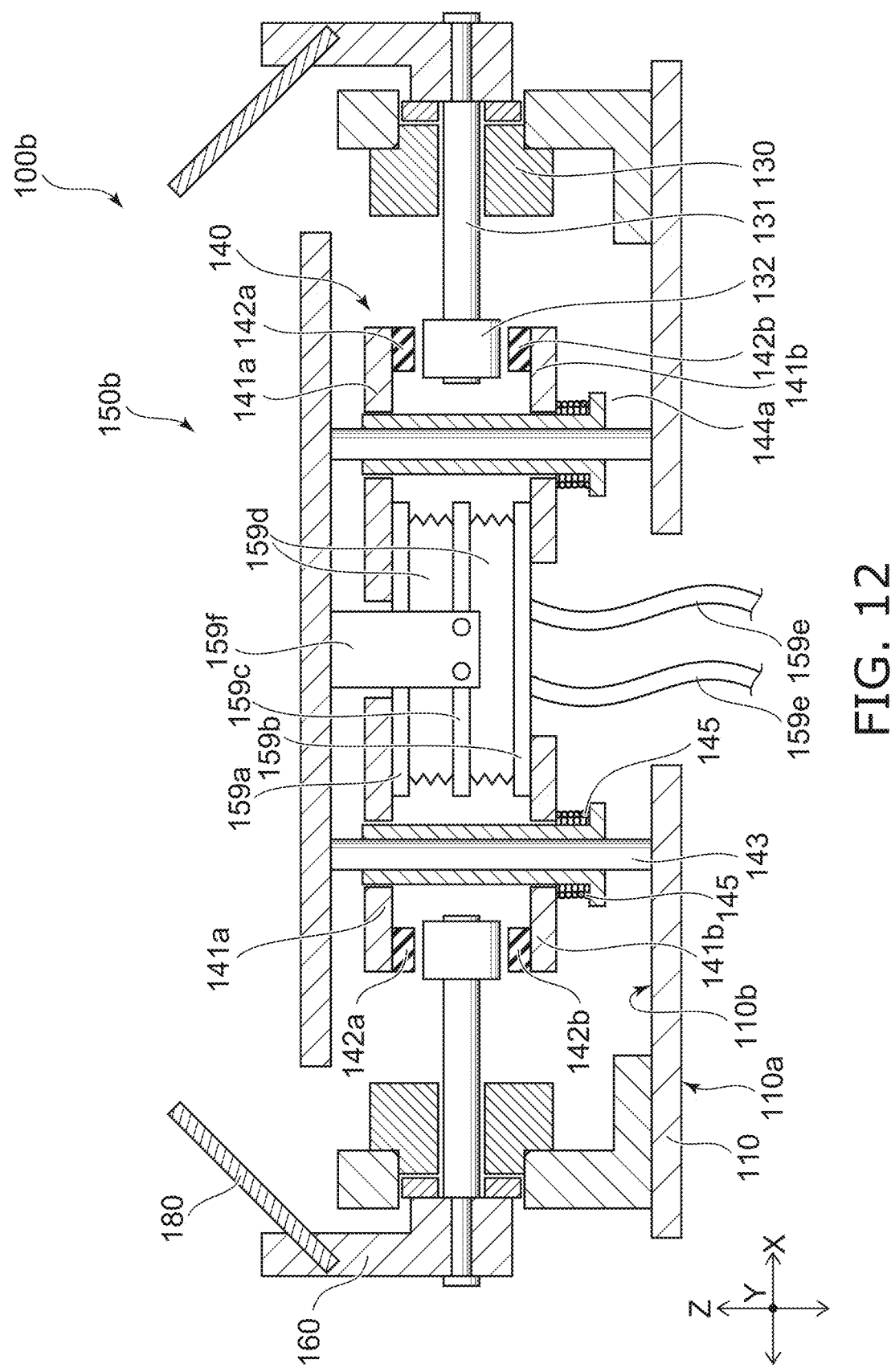
FIG. 12 is a schematic cross-sectional view showing the portion of the parallel link mechanism according to the second variation of the embodiment.

FIGS. 11 and 12 are schematic cross-sectional views showing a portion of a parallel link mechanism according to a second variation of the embodiment.

In a parallel link mechanism 100b shown in FIGS. 11 and 12, a switching unit 150b is provided instead of the switching unit 150. The switching unit 150b includes the pedestal 154, an upper pressure receiving surface 159a, a lower pressure receiving surface 159b, a fixing ring 159c, extensible members 159d, tubes 159e, and a pillar 159f.

The upper pressure receiving surface 159a, the lower pressure receiving surface 159b, the fixing ring 159c, and the extensible members 159d are provided between the upper plate 141a and the lower plate 141b. The upper pressure receiving surface 159a and the lower pressure receiving surface 159b are plate-shaped members extending along the X-Y plane. The upper pressure receiving surface 159a is in contact with the upper plate 141a. The upper pressure receiving surface 159a may be fixed to the upper plate 141a. The lower pressure receiving surface 159b is in contact with the lower plate 141b. The lower pressure receiving surface 159b may be fixed to the lower plate 141b. The fixing ring 159c is positioned between the upper pressure receiving surface 159a and the lower pressure receiving surface 159b. The fixing ring 159c is an annular member provided along the X-Y plane.

The extensible members 159d are provided between the upper pressure receiving surface 159a and the fixing ring 159c and between the lower pressure receiving surface 159b and the fixing ring 159c. The extensible members 159d can extend and contract along the Z direction. In the shown example, the extensible member 159d has a bellows configuration. The extensible member 159d may be an extensible rubber, or the like. An internal space surrounded by the upper pressure receiving surface 159a, the lower pressure receiving surface 159b, the fixing ring 159c, and the extensible members 159d is airtight. The tubes 159e are connected to the internal space.

The fixing ring 159c is fixed to the pedestal 154 via the pillar 159f. A position of the fixing ring 159c in the Z direction is the same as the position of the drive shaft 131 in the Z direction. The upper pressure receiving surface 159a and the lower pressure receiving surface 159b move in the Z direction in accordance with a pressure of the internal space. The extensible members 159d are deformed in accordance with movements of the upper pressure receiving surface 159a and the lower pressure receiving surface 159b. When the internal space is depressurized through the tubes 159e, as shown in FIG. 11, the upper plate 141a moves upward and the lower plate 141b moves downward by the elastic force of the elastic member 145. The upper braking pad 142a and the lower braking pad 142b come into contact with the drum 132 to brake the motor 130.

When the internal space is pressurized through the tubes 159e, as shown in FIG. 12, the upper pressure receiving surface 159a moves upward and the lower pressure receiving surface 159b moves downward. The upper plate 141a is pushed up by the upper pressure receiving surface 159a, and the lower plate 141b is pushed down by the lower pressure receiving surface 159b. Accordingly, the upper braking pad 142a and the lower braking pad 142b are separated from the drum 132, so that the drive shaft 131 becomes rotatable.

As described above, the specific configuration for moving the upper braking pad 142a and the lower braking pad 142b can be appropriately changed. In any configuration, it is not necessary to provide the actuator for driving the braking pads for each motor 130, so that the parallel link mechanism can be downsized. Further, in the robot mechanism 1 shown in FIG. 7, the parallel link mechanism 100a or 100b may be provided instead of the parallel link mechanism 100. Also in such a case, the movement of the manipulator 200 can be reduced, and the robot mechanism 1 can operate more safely.

For the purpose of further downsizing, the parallel link mechanism 100 is particularly favorable as compared with the parallel link mechanisms 100a and 100b. In the parallel link mechanism 100, the upper braking pad 142a and the lower braking pad 142b can be moved simply by rotating the rotating body 151. According to the parallel link mechanism 100, the configuration can be simplified and the size can be reduced as compared with the link mechanism of the parallel link mechanism 100b and a balloon mechanism of the parallel link mechanism 100c.

Although some embodiments of the invention have been described above, these embodiments have been presented by way of example and are not intended to limit the scope of the invention. These novel embodiments can be implemented in a variety of other forms, and various omissions, substitutions, changes, and the like can be made without departing from the gist of the invention. Such embodiments or their modifications fall within the scope of the invention as defined in the claims and their equivalents as well as within the scope and gist of the invention. The above-described embodiments can be Implemented in combination with each other.

What is claimed is:

1. A parallel link mechanism comprising:
a base portion;
a movable portion separated from the base portion in a first direction;

a braking unit provided between the base portion and the movable portion, and including
a plurality of first braking pads,
a plurality of second braking pads respectively facing the plurality of first braking pads in the first direction,
a first plate extending along a first surface intersecting the first direction, the plurality of first braking pads being attached to the first plate, and
a second plate extending along the first surface and positioned between the base portion and the first plate, the plurality of second braking pads being attached to the second plate, the plurality of first braking pads and the plurality of second braking pads being positioned between the first plate and the second plate;
a plurality of motors provided around the braking unit, and each including a drive shaft extending along a direction intersecting the first direction;
a plurality of links each coupled between the plurality of drive shafts and the movable portion; and
a switching unit provided between the base portion and the movable portion, and configured to switch, by moving the plurality of braking pads, between a contact state in which the plurality of braking pads are in contact with the plurality of drive shafts and a non-contact state in which the plurality of braking pads are separated from the plurality of drive shafts, wherein
in the contact state, the plurality of drive shafts are sandwiched between the plurality of first braking pads and the plurality of second braking pads, respectively,
the switching unit includes a rotating body positioned between the first plate and the second plate and configured to rotate around the first direction,
in response to the rotating body being inserted between a portion of the first plate and a portion of the second plate, the first plate and the second plate are moved in directions separated from each other, thereby shifting from the contact state to the non-contact state, and
in response to the rotating body being removed from between the portion of the first plate and the portion of the second plate, the first plate and the second plate are moved in directions approaching each other, thereby shifting from the non-contact state to the contact state.

2. The mechanism according to claim 1, wherein the switching unit switches between the contact state and the non-contact state by changing a distance between the first plate and the second plate.

3. The mechanism according to claim 1, wherein each of the plurality of drive shafts is provided along a direction from a center portion of the base portion toward an outer periphery of the base portion.

4. The mechanism according to claim 1, wherein when electric power is not supplied to the switching unit, the plurality of braking pads are in the non-contact state.

5. The mechanism according to claim 1, wherein the base portion is attached to a distal end of a manipulator.

6. A robot mechanism comprising:
a manipulator; and
the parallel link mechanism according to claim 1 of which the base portion is attached to a distal end of the manipulator.

7. The mechanism according to claim 6, further comprising:

an end effector attached to the movable portion.

\* \* \* \* \*